(12) United States Patent
Rajkumar et al.

(10) Patent No.: US 7,391,769 B2
(45) Date of Patent: Jun. 24, 2008

(54) PACKET AGGREGATION FOR REAL TIME SERVICES ON PACKET DATA NETWORKS

(75) Inventors: Ajay Rajkumar, Morristown, NJ (US); Michael D. Turner, Madison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 958 days.

(21) Appl. No.: 10/608,628

(22) Filed: Jun. 27, 2003

(65) Prior Publication Data
US 2004/0264454 A1 Dec. 30, 2004

(51) Int. Cl.
H04L 12/28 (2006.01)
(52) U.S. Cl. .................. 370/389; 370/329; 370/434
(58) Field of Classification Search ................ 370/471, 370/401, 328, 389; 709/223
See application file for complete search history.

(56) References Cited

U.S. PATENT DOCUMENTS

| | | | |
|---|---|---|---|
| 6,839,356 B2 * | 1/2005 | Barany et al. ............... | 370/401 |
| 7,002,993 B1 * | 2/2006 | Mohaban et al. ............ | 370/471 |
| 7,072,336 B2 * | 7/2006 | Barany et al. ............... | 370/389 |
| 7,149,795 B2 * | 12/2006 | Sridhar et al. ............... | 709/223 |
| 2001/0043577 A1 * | 11/2001 | Barany et al. ............... | 370/328 |
| 2003/0091017 A1 * | 5/2003 | Davenport et al. .......... | 370/338 |

FOREIGN PATENT DOCUMENTS

| | | |
|---|---|---|
| EP | 1 189 397 | 3/2002 |
| EP | 1 220 554 | 7/2002 |
| WO | WO 02/35785 | 5/2002 |

OTHER PUBLICATIONS

Mogul, J., et al.; "Path MTU Discovery" Request for Comments: 1191 Nov. 1990.
Cameron P et al: "Transport Mutiplexing Protocol (TMux)" Requests for Comments 1692, Aug. 1994, pp. 1-12, XP002149445. p. 2, paragraph 6 p. 6, paragraph 5—paragraph 6 p. 8, paragraph 1—p. 9, paragraph 1.

(Continued)

*Primary Examiner*—Chi Pham
*Assistant Examiner*—Albert T. Chou

(57) ABSTRACT

A method and equipment is used to transmit and/or receive time delay-intolerant information over a communication system. The information is transmitted in aggregated form. A plurality of packets representing time delay-intolerant information is combined to form an aggregate packet. The aggregate packet is formed based on user service requirements while maintaining time delay requirements of the information. The size of the aggregated is formed from a negotiation between the transmitting equipment and receiving equipment. Because of the use of an aggregated packet less scheduling of packets is done and the aggregated packet can be transmitted at a rate different than the fixed rate of the time delay-intolerant information. The equipment comprises transmit equipment and receive equipment. The transmit equipment contains an aggregator that combines a plurality of packets based on user service requirements. The packets to be transmitted are retrieved at the fixed rate of the time delay-intolerant information. The size of the aggregate packet can be determined on a static or dynamic basis. The receiving equipment contains a de-aggregator circuit that receives aggregated packets and generates individual packets from the received aggregated packet. The generated individual packets are retrieved from the de-aggregator at the fixed rate of the time delay-intolerant information.

14 Claims, 3 Drawing Sheets

OTHER PUBLICATIONS

Rosenberg J; Schulzrinne H: "Issues and Options for RTP Multiplexing" Internet Draft Oct. 1, 1998, pp. 1-27, XP002149446 paragraph '4.3.1.1!—paragraph '4.3.1.3!.

El-Khatib K et al: "Multiplexing Scheme for RTP Flows between Access Routers <draft-ietf-avt-multiplexing-rtp-00.txt>" Internet Draft, Jun. 24, 1999, pp. 1-13, XP002149447 paragraph '02.6!.

* cited by examiner

PACKET AGGREGATION FOR REAL TIME SERVICES ON PACKET DATA NETWORKS

BACKGROUND OF THE INVENTION

1. Field of the Invention

The present invention generally relates to transmission and reception of real time information over communication networks.

2. Description of the Related Art

Certain types of communication signals conveyed over communication systems have the characteristic of being time delay-intolerant. These signals are typically referred to as real time signals, which have strict time delay constraints. The communication system over which the time delay-intolerant signals are conveyed typically comply with the time delay constraints of such signals. Packet switched communication systems convey packets of real time information and other information to and from various nodes where packets carrying real time information comply with the time delay constraints of such information. Packet switched communication systems are communication systems in which the communication signals are converted into one or more packets that are configured as per the protocol being followed by the communication system. The protocol is a set of rules and procedures for initiating, maintaining and/or terminating communications between any two nodes of a communication system. A protocol is usually part of an established standard promulgated by standards bodies such as industry groups and/or governmental agencies. The owner of the communication system, i.e., a service provider, is usually an entity such as a local telephone company or an Internet Service Provider (ISP) or both that operates, controls and maintains the communication system that provides communication services to users of the system.

A packet typically is a group of bits comprising a header portion that contains signaling information and another portion called the payload, which contains the information being conveyed. Packets also have a trailer portion, which contains error correction information that allows a receiver to determine if the packet is received with errors. The signaling information is used by the protocol to regulate the routing and processing of the packet as it travels within the communication system. The header and trailer portions of a packet represent overhead information. Packets to be transmitted in a packet switched communication system are scheduled by the system and are transmitted as per their scheduled times. The scheduling as well as the actual transmission of packets of real time signals or packets carrying real time information have to comply with the time delay constraints of such signals or information.

Examples of real time signals include voice and video signals, both of which can be conveyed over a packet switched communication system in a certain manner to comply with their time delay constraints. The Internet is an example of a packet switched network; the Internet complies with a suite of IP (Internet Protocol), which routes the transmission of packets. VoIP (voice over IP) is one type of delay-intolerant information that can be conveyed over the Internet. Packets of real time signals have to be transmitted at a constant interval for which they have to be scheduled at a fixed time interval. The fixed time interval is a direct consequence of the time delay constraint of these real time signals. Real time signals such as voice and video signals are generated as a flow of information that have a certain constant rate of information flow, which should not be interrupted. The constant rate of flow ultimately defines a constant time period that elapses between each packet transmission. A transmitter transmits real-time packets at a constant rate and a receiver wants to receive these packets at the same constant rate.

Packet data networks are prone to arbitrary inter-packet delays. To ensure packets arrive at a receiver at a constant rate, communication systems typically have used buffers. However, these buffers, also known as "jitter buffers", are located within the receiver end-point or at an intermediate point from where onwards the rate of flow of the packets can be ensured. These buffers temporarily store a set of packets before they are transmitted at a desired rate of flow to the receiver.

In wireless packet data networks such as 1×EV-DO(1× Evolution Data Only), 1×EV-DV(1×Evolution Data and Voice), and HSDPA (High Speed Downlink Packet Access), and similar communication systems standards data users are scheduled. In scheduled systems, the available data rate is typically dependent on criteria such as channel availability, channel conditions and user priority; therefore the available data rate or the available frequency at which data can be transmitted may be less than the required data rate for real-time packet transmission. Also, because of the fixed rate transmission of real-time packets, the system is not able to take advantage of higher channel capacity availability. As a result of the aforementioned disadvantages, the capacity of the system is often adversely affected.

What is therefore needed is a technique for conveying (i.e., transmit and/or receive) real time information over a communication system that reduces the adverse effects on capacity and efficiency of the communication system.

SUMMARY OF THE INVENTION

The present invention provides a method and equipment for conveying information having time delay constraints over a communication network to improve system capacity and efficiency of the network. The method and equipment of the present invention allows the time delay-intolerant information (e.g., real-time information) to be transmitted over a communication system at a rate other than the fixed rate of the time delay-intolerant information and is able to take advantage of higher channel capacity availability thus improving the overall capacity and efficiency of the communication system.

The time delay-intolerant information is transmitted in aggregated form. A plurality of packets representing time delay-intolerant information is combined to form an aggregate packet. The aggregate packet is based on user service requirements criteria, such as channel availability, channel conditions, user priority, and similar such parameters while maintaining time delay requirements of the information. The aggregate packet may be further based on the allowed transmission rate; that is the data rate at which information can be transmitted at that point in the communication system. The size of the aggregated packet is based on a negotiation between the transmitting equipment and receiving equipment. Because of the use of an aggregated packet, less scheduling of packets is done and the aggregated packet can be transmitted at a rate different than the fixed rate of the time delay-intolerant information. Further, the method of the present invention can take advantage of higher channel capacity availability thus improving the overall capacity of the communication system.

The equipment comprises transmit equipment and receive equipment. The transmit equipment comprises an aggregator that combines a plurality of packets based on user service requirements and after having negotiated a packet size with receiving equipment. The packets to be transmitted are retrieved at the fixed rate of the time delay-intolerant information. The size of the aggregate packet can be determined on a static or dynamic basis.

The receiving equipment comprises a de-aggregator circuit that receives aggregated packets and generates individual packets from the received aggregated packet. The generated individual packets can be retrieved from the de-aggregator at the fixed rate of the time delay-intolerant information.

DETAILED DESCRIPTION

The present invention provides a method and equipment for conveying information having time delay constraints over a communication network to improve system capacity and efficiency of the network. The method and equipment of the present invention allows the time delay-intolerant information (e.g., real-time information) to be transmitted over a communication system at a rate other than the fixed rate of the time delay-intolerant information and is able to take advantage of higher channel capacity availability thus improving the overall capacity and efficiency of the communication system.

The time delay-intolerant information is transmitted in aggregated form. A plurality of packets representing time delay-intolerant information is combined to form an aggregate packet. The aggregate packet is based on user service requirements criteria, such as channel availability, channel conditions, user priority, and similar such parameters while maintaining time delay requirements of the information. The aggregate packet may be further based on the allowed transmission rate; that is the data rate at which information can be transmitted at that point in the communication system. The size of the aggregated packet is based on a negotiation between the transmitting equipment and receiving equipment. Because of the use of an aggregated packet, less scheduling of packets is done and the aggregated packet can be transmitted at a rate different than the fixed rate of the time delay-intolerant information. Further, the method of the present invention can take advantage of higher channel capacity availability thus improving the overall capacity of the communication system.

The equipment comprises transmit equipment and receive equipment. The transmit equipment comprises an aggregator that combines a plurality of packets based on user service requirements and after having negotiated a packet size with receiving equipment. The packets to be transmitted are retrieved at the fixed rate of the time delay-intolerant information. The size of the aggregate packet can be determined on a static or dynamic basis.

The receiving equipment comprises a de-aggregator circuit that receives aggregated packets and generates individual packets from the received aggregated packet. The generated individual packets can be retrieved from the de-aggregator at the fixed rate of the time delay-intolerant information.

Figure 1A:
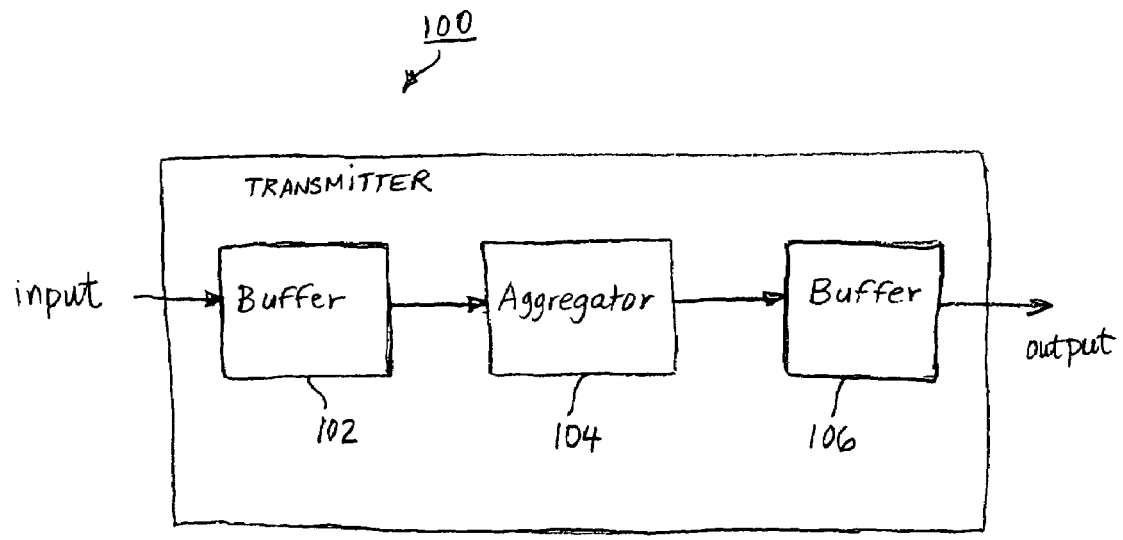
FIGS. 1A and 1B show block diagrams of communication equipment for transmitting aggregated information and receiving aggregated information.
Figure 1B:
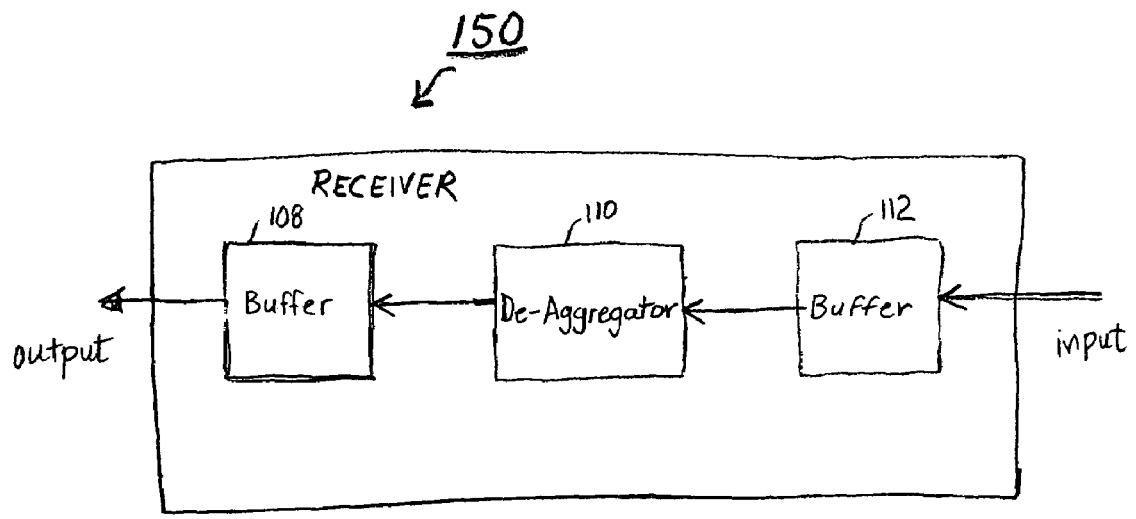

Referring to FIGS. 1A and 1B, there are shown transmitter and receiver equipment that practice the method of the present invention in a communication system. Transmitter equipment 100 comprises aggregator 104, having a first buffer 102 coupled to its input and a second buffer 106 connected to its output. Delay-intolerant information, typically in the form of a stream of packets is applied to first buffer 102.

When the transmitter is operating in a terminal mode, buffer 102 of the transmitter receives packets of information at a fixed rate, i.e., the rate at which the delay-intolerant information is transmitted. In the terminal mode, either a terminal equipment is coupled to the input of the transmitter equipment or information being inserted in the transmitter equipment at a rate equal to the fixed rate. The stream of packets can be generated by a signal encoder (not shown). The signal encoder can be any well known device or processor that converts a signal to its compressed digitized version (usually in the form of a bit stream) and then generates packets from the compressed bit stream. When the signal is a real time signal such as voice, the signal encoder generates a packet of information at a fixed rate. For example, the signal encoder can be a Vocoder, which converts a train of digital bits representing a voice signal to a compressed train of bits containing a reduced number of bits and such reduced number of bits is formatted into one or more packets as per the protocol being followed by the communication system. One example of a Vocoder is an EVRC (Enhanced Variable Rate Codec) that generates a packet typically every 20 milliseconds.

The packets generated by the Vocoder are retrieved by first buffer 102. If a packet is generated and is not retrieved in time by Buffer 102, that packet is "dropped" meaning that the packet is lost; this is because the encoder (e.g., Vocoder) does not wait for buffer 102 to retrieve the generated packet. Signal encoding is thus the process of generating compressed information (i.e., compressed bits) and arranging such information into packets whose configuration (header, payload, trailer) complies with the protocol being followed by the communication system through which such packets are to propagate. Buffer 102 operates such that it retrieves the packets from the encoder at a rate equal to or greater than the fixed rate at which the encoder generates the packets. The packets generated by the encoder are temporarily stored in buffer 102. Buffer 102 is any well known circuit or system used to temporarily store digital information. The packets can be retrieved from Buffer 102 at a certain fixed rate or at variable rates. The information retrieved from Buffer 102 is applied to aggregator 104. Depending on the processing speed of aggregator 104, buffer 102 may have to perform buffer management; that is, buffer 102 may have to temporarily store the incoming packets to allow aggregator 104 time-process the received information. Buffer management is the temporary storage of information being inserted in the buffer at a certain input rate to allow the information to be transferred out of the buffer at an output rate that is lower than the input rate. Each of the packets retrieved has its own header and tail information; this information is used by the communication system as per the protocol to route the packets as they propagate through the communication system. The packets are retrieved from Buffer 102 by aggregator 104.

Aggregator 104 is a system or circuit or processor that receives one or more packets and combines these packets into an aggregated packet. In addition to buffers 102 and 106 aggregator 104 may also contain internal buffer circuits at its input and output. The internal buffers may be used without external buffers 102 and 106 or they may provide additional buffering capabilities to buffers 102 and 106. The aggregated packet is configured as per the protocol being followed. For example, the aggregated packet has a head portion, a payload and a tail portion. The individual packets constituting the aggregate packets each had a head portion, a payload and a tail portion prior to aggregation. One technique of forming the aggregate packet may involve stripping the head and tail of each of the packets and combining the payloads to form the aggregate packet with its own head and tail. When the head and tail of the aggregate packet contain less information than the combined heads and tails of the individual packets information compression is said to occur resulting in a more efficient usage of the communication channels of the system. For example, if N packets are combined as described above into one aggregated packet where N is an integer equal to 2 or greater, the aggregated packet uses one head and one tail portion. As a result, less information is transmitted through the communication system because the individual head and tail portions of each of the packets are not used. Further, when aggregated packets are used, less scheduling is done because now the system has to schedule the aggregated packet not the N individual packets and thus the scheduling is less frequent. The aggregated packet may be formed such that information compression does not occur.

The aggregator not only combines packets into aggregated packets but may also have equipment for performing channel coding on the aggregated packet and also digital modulation of the aggregated packet. Channel coding is a technique of adding redundancy to information to be transmitted to improve the likelihood that such information, once received, can be properly decoded. One example of channel coding is the well known technique of convolutional coding. Digital modulation is any well known technique of grouping bits to represent certain symbols that are transmitted over communication channels of the communication system. An example of digital modulation is QPSK (Quadrature Phase Shift Keying) where each symbol represents two bits of information and the symbol is a sinusoid signal whose phase is altered based on the values of the two bits. The aggregator further contains processing circuitry that negotiates with a receiving node regarding the aggregation factor. The aggregation factor is the number of packets used to form the aggregated packet, i.e., represented by the integer N. The aggregation factor can depend on a plurality of parameters such as current channel conditions, the delay (between packets) that is acceptable to the user, the data rate capability of the system and the current loading of the system. The parameters on which the aggregation factors depend are referred to as user service requirements.

User service requirements represent a certain quality of service that a user can expect to receive. The quality of service (QoS) is a set of factors which when combined provide a certain level of service to a user. For example, a service provider may categorize user service requirements in terms of service levels such as HIGH, MEDIUM and LOW. A user who paid for a HIGH service expects to transmit and/or receive real time signals with a guaranteed delay and no discernible distortion of the signals at any time. The HIGH service user expects to be able to convey information (i.e., transmit and/or receive) at a relatively high data rate that can be obtained in view of the time delay constraints of the delay-intolerant signals. A user who paid for a MEDIUM service may expect to be able to convey information at the same rate as a HIGH service user, but may not be able to do so when system conditions are near capacity. For example, when the number of users currently using the system during prime time (e.g., business hours during weekday) is near the capacity of the system, a MEDIUM user may not be able to transmit at a relatively high data rate or transmit at a certain power level. The MEDIUM user is actually unaware of the particular system resources it has been allocated, but will detect a lower quality level of service. A LOW service user may not at any time be able to transmit at a desired rate. Further, a LOW service user may not be able to gain access to the system because the available resources are reserved for the higher level users. Even further, a LOW user may have its communications abruptly terminated (e.g., call is dropped) because of adverse system conditions and/or the system's need to provide adequate services to the higher level users.

The service provider will allocate various resources and techniques such as bandwidth, transmission power, type of modulation, bit error rate and type and amount of channel coding to meet or surpass the quality of service expected by a user. Further, the degree of aggregation performed by the aggregator, i.e., determining the value of N, can be done statically or dynamically. When done statically, the value of N is determined based on various factors at the start of communications for a particular user. The various factors include the state of some of the aforementioned resources; i.e., amount of transmission power available, data rate available, amount of coding used, type of modulation used, amount of bandwidth available. During a particular communication, the value of N is not changed unless circumstances require its change to maintain the quality of service required by the user. When done dynamically, current channel and overall system conditions are monitored and the resources allocated to the communications for a particular user are updated to more efficiently use available resources while still maintaining the quality of service expected by the user. For example, one of the factors that may be considered is system loading which gives an indication on how close the system is to reaching its capacity.

In dynamic aggregation the rate at which the aggregate packets are transmitted may remain the same or may vary. The number of packets per aggregated packets, i.e., N, may also change depending on the various factors and channel conditions discussed above. The determination of N can be done by a mobile or by system equipment such as a base station. Any equipment (mobile or base station) that can transmit aggregated packets will have the capability to negotiate with other equipment for the determination of parameter N. For example, a mobile that is transmitting information over an uplink to a base station negotiates with a base station either dynamically or statically (or both) to determine the value of N for the particular transmission.

In the static case, the value of N will not change for the established communications; in the dynamic case, the value of N will be determined for one particular transmission and may change for the next transmission. Conversely, a base station that is scheduled to transmit over a downlink to a particular mobile can negotiate with the mobile to determine the value of N. As with the uplink case, the equipment scheduled to transmit the aggregated packet will use various factors (discussed above) to dynamically or statically determine the value of N. Therefore, the negotiation between equipment is initiated by the equipment scheduled to transmit an aggregated packet comprising N packets where N is an integer equal to 2 or greater. Once the aggregated packet is formed, such a packet can be transmitted throughout the communication system at rates different from the fixed rate of the information that formed the packet. If the aggregated packet is to be transmitted at a rate that is lower than the rate at which the source generates such packets, then buffer 102 will perform buffer management. Also, the aggregated packets can be transmitted at a rate that is higher than the fixed rate taking advantage of higher channel capacities of the communication system.

The transmitter equipment can also operate in the relay mode whereby the equipment is not receiving packets at a fixed rate from a terminal equipment or other equipment. In the relay mode, buffer 102 receives packets at a rate other than the fixed rate of the time delay-intolerant information represented by the packets. Depending on the incoming rate of the packets, the processing speed of aggregator 104 and the rate at which buffer 106 can output the packets, either buffer 102 or 106 or both may have to perform buffer management. In other cases, neither buffer will perform buffer management. Other than the different types of buffer management described above, the transmitter in the relay mode operates in significantly the same manner as in the transmitter mode. Aggregate packet size is determined from negotiations with a corresponding receiver equipment and user service requirements. The aggregate packet size can be determined statically or dynamically or both at different times.

The receiver equipment shown in FIG. 1B comprises de-aggregator 110 whose input is coupled to buffer 112 and output is coupled to buffer 108. Buffer 112 receives aggregated packets from a node in the communication network and if necessary, performs buffer management. The received aggregated packets are temporarily stored in buffer 112. Buffer 112 provides de-aggregator 110 some flexibility in terms of the amount of time de-aggregator 110 uses to process the de-aggregated packets; that is, buffer 112 may perform buffer management or may output the information at the same rate as the information input rate. Buffer 112 transfers the aggregated packets to de-aggregator 110 at a rate that is commensurate with the processing speed of de-aggregator 110.

In cases where the processing speed of de-aggregator 110 is slower than the rate at which the aggregated packets are being received, buffer 112 uses buffer management thus allowing the de-aggregator the time to process the received information by buffering (i.e., temporary storage) the information for a temporary period before it transfers it to de-aggregator 110. In other cases, buffer 112 may not have to buffer the incoming aggregated packets. De-aggregator 110 then converts the aggregated packets to single individual packets. De-aggregator is provided with information about the size of the aggregated packet (i.e., N) and the type of modulation and coding used in transmitting the aggregated packet. De-aggregator 110 has the corresponding demodulation and channel decoding circuitry or processors to process the received aggregated packets. The single packets are stored in buffer 108. De-aggregator 110 may also contain internal buffers at its input and output which can provide buffering capabilities in addition to external buffers 108 and 112.

Buffer 108 then transfers the packets to terminal equipment or other processing equipment. When the equipment to which buffer 108 is transferring the packets is terminal equipment, then the rate of transfer is at the fixed rate of the delay-intolerant information represented by the packets; in such a case the receiver equipment is in the terminal mode. Terminal equipment is typically equipment for which the delay-intolerant information was destined or equipment that is to convert the single packets to the original delay-intolerant information. One example of a terminal equipment is a mobile (e.g., cellular phone).

In the terminal mode the rate at which the single packets are transferred to the terminal equipment (not shown) is at the fixed rate of the delay-intolerant information. In the terminal mode, the combined rates at which de-aggregator 110 and buffer 108 output information is equal to the fixed rate of the delay-intolerant information. For example, de-aggregator 110 can be transferring the packets to buffer 108 at the fixed rate and buffer 108 simply passes the information on to the terminal equipment without performing any buffer management. Another example is de-aggregator 110 can be transferring the packets to buffer 108 at a rate that is faster than the fixed rate and buffer 108 performs buffer management so as to output the information at the fixed rate. Thus, depending on the difference in output rates of the buffer 108 and the de-aggregator 110, buffer management may be performed by buffer 108.

When the receiver equipment is in the relay mode, buffer 108 can output the packets at a rate other than the fixed rate. In certain cases aggregated packets can be received by buffer 112 at a rate that is higher than the fixed rate of the time delay-intolerant information. In the relay mode buffer 112 can perform no buffer management and allow the received aggregated packets to flow through without any delay. De-aggregator 110 can be designed to process the aggregated packets such that it outputs them at the incoming rate or at a rate that is higher than the fixed rate of the time delay-intolerant information. Buffer 108 also can perform no buffer management and thus the single packets can be transmitted at a rate that is higher than the fixed rate of the time delay-intolerant information thus taking advantage of higher capacities of communication channels of the system thus improving the efficiency of the system. However, depending on the data rates of the received aggregated packets, the processing speed of de-aggregator 110 and the allowed data rate of the system at the point of the receiver, buffer management may have to be performed by either buffer 112 or 108 or both.

Both the transmit equipment 100 and the receive equipment 150 can operate in either the terminal mode or the relay mode. The receive equipment as well as the transmit equipment can reside in system equipment such as a base station. Moreover the receive equipment as well as the transmit equipment can reside in user equipment such as a mobile (e.g., cell phone, wireless PC, PDA (Personal Digital Assistant)). A base station can have both transmit and receive equipment. A mobile can have both transmit and receive equipment as well.

Figure 2:
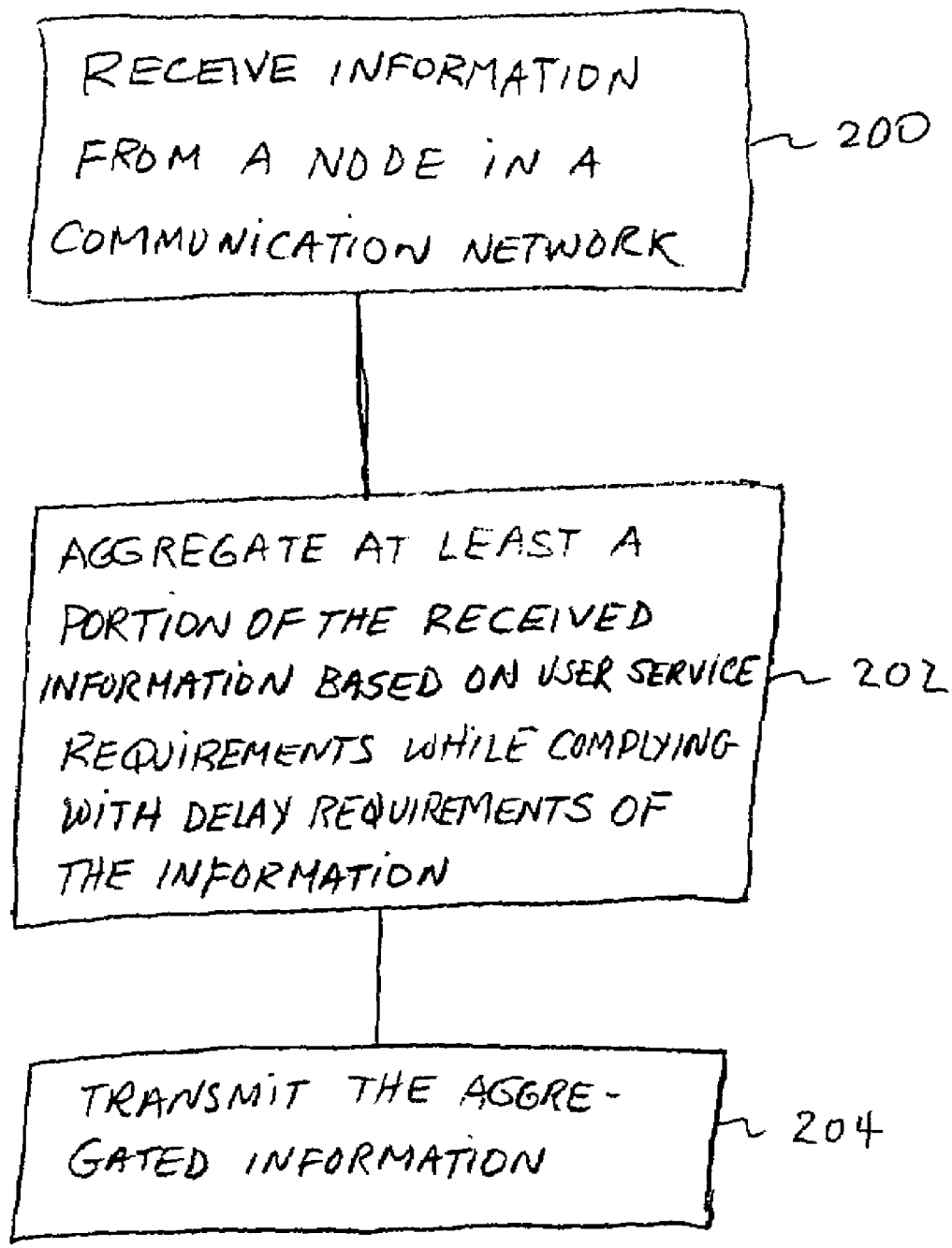
FIG. 2 is a flow chart for transmission of aggregated information in accordance with the method of the present invention.

Referring to FIG. 2, the steps of the method of the present invention as performed by transmit equipment are shown. In step 200, information (typically in the form of a bit stream or as an analog signal) is received from a communication device. The communication device can be any device that can generate or be a source of a signal. As discussed above if the transmit equipment is in the terminal mode the signal is applied to a signal encoder (e.g., a vocoder) which converts said signal to packets configured to comply with any and all protocols being followed by the communication system within which the transmitter equipment is located. The packets are retrieved from the signal encoder at a fixed rate equal to a rate established by the vocoder or system as the correct fixed rate for the signal. Depending on the characteristics of the signal, the signal encoder will be operated to generate the packets at the proper fixed rate. The operation of the signal encoder is designed and controlled by the communication system within which the transmit equipment is located. The retrieved packets are stored in a buffer.

When the transmit equipment is in the relay mode, the received information originates from equipment other than terminal equipment and may be received at a rate other than the fixed rate of the time delay-intolerant information represented by the packets. The buffered information in the form of packets is then applied to an aggregator. In step 202, the aggregator negotiates with system equipment to determine the size of the aggregate packet it is to create from a combination of a plurality of packets. The negotiation is based on current system conditions, resources currently available and the quality of service to be given to the received information as discussed above; these factors on which the aggregated packet are based are discussed above as user requirements. An aggregated packet is created while maintaining the time delay requirements of the signal. The time delay requirements are provided to the aggregator by the system or by the signal encoder—in the case of the transmitter being in the terminal mode. The aggregator thus generates the aggregate packet and still maintains the time delay requirement (i.e., fixed rate) of the signal. The aggregator may include information in the header of the aggregate packet indicating the rate of the information. The aggregated packet is channel coded, modulated so as to meet the particular user requirements associated with the received information. In step 204 the aggregate packet is transmitted to a node in the communication system. The node may be system equipment (e.g., base station) or user equipment (e.g., mobile). The aggregated packet may be transmitted at a rate that is different from the fixed rate of the time delay-intolerant information.

Figure 3:
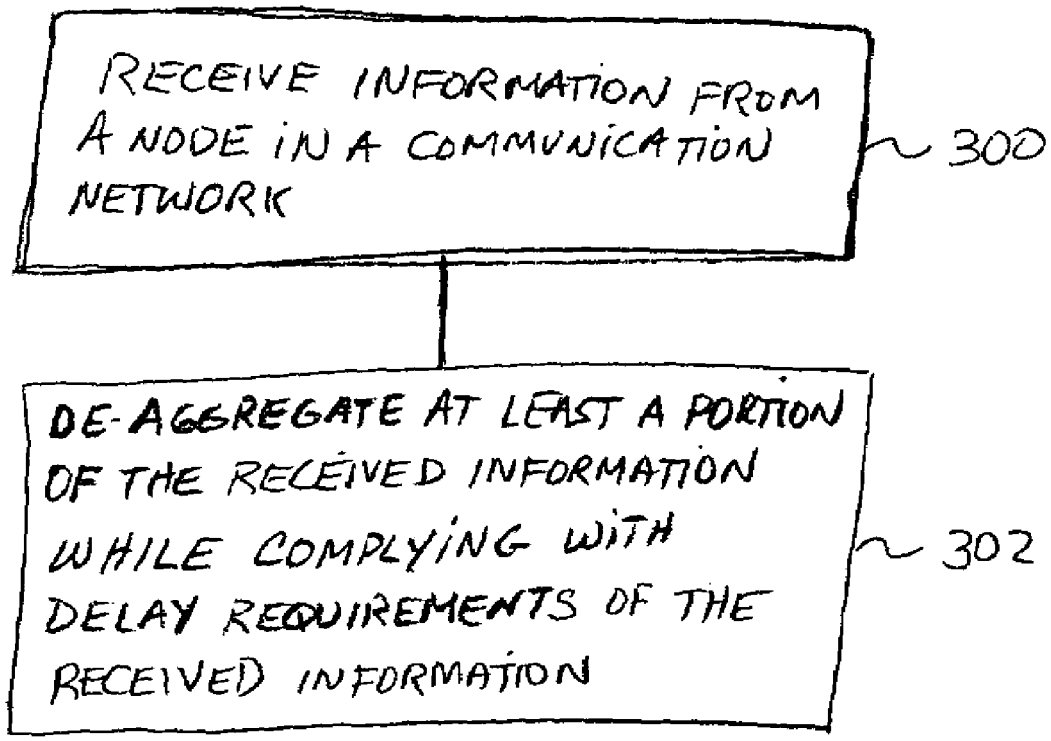
FIG. 3 is a flow chart for receiving aggregated information in accordance with the method of the present invention.

Referring now to FIG. 3, the steps of the method of the present invention as performed by receive equipment are shown. In step 300, aggregated information is received from a node in the communication system. The node can be system equipment or user equipment. The receive equipment is advised or is aware of the degree to which the information received is aggregated. For example, the receive equipment may know the number of packets contained in a received aggregate packet. The received aggregated information is temporarily stored in a buffer. The information is then applied to a de-aggregator which demodulates and channel decodes the received information. The de-aggregator then converts the information into its unit portions. For example in the case of packets, the aggregated packet is converted into N packets where N is equal to 2 or greater. The N packets are temporarily stored in a buffer and when the receive equipment is in the terminal mode, the packets are inputted to a signal decoder or other terminal equipment at a fixed rate. When the receive equipment is in the relay mode the de-aggregated packets are applied to other equipment at a rate other than the fixed rate. In the relay mode, the rate at which the packets are transferred to other equipment may be the fixed rate of the time delay-intolerant information.

We claim:

1. A transmitting communication equipment comprising:
   an aggregator for aggregating information and for transmitting the aggregated information as an aggregated packet to a receiving communication equipment, said receiving equipment having a de-aggregator for de-aggregating the aggregated packet,
   wherein the information comprises a plurality of time-delay intolerant data packets scheduled for transmission at a designated rate, said designated rate being based on at least one time delay constraint of the data packets,
   wherein an aggregation factor, which is the number of said plurality of data packets in the aggregated packet, is based at least in part on at least one user service requirement and a negotiation between the transmitting communication equipment and the receiving communication equipment, and
   wherein the aggregated packet is transmitted by the transmitting equipment to the receiving equipment at a rate different than the designated rate of the data packets.

2. The transmitting communication equipment of claim 1 wherein the at least one user service requirement comprises channel conditions of a communication channel used for transmitting the aggregated packet between the transmitting communication equipment and the receiving communication equipment.

3. The transmitting communication equipment of claim 2 wherein:
   the channel conditions are monitored on an ongoing basis during communications between the transmitting communication equipment and the receiving communication equipment; and
   an aggregation factor of each of a plurality of aggregated packets transmitted from the transmitting communication equipment to the receiving communication equipment is based at least in part on the channel conditions at the time when the aggregated packet is generated.

4. The transmitting communication equipment of claim 2 wherein:
   the aggregator has an input for coupling to a first buffer; and
   the first buffer receives the data packets at the designated rate from a terminal equipment if the transmitting communication equipment operates in a terminal mode, and the first buffer receives the data packets from equipment other than the terminal equipment, at a rate other than the designated rate, if the transmitting communication equipment operates in a relay mode.

5. The transmitting communication equipment of claim 2 wherein the user service requirements on which the aggregation factor is based further include (i) a data rate capability of a communication system within which the equipment is being used, (ii) a current loading level of the system and/or channel, and (iii) a designated quality of service level of the receiving communication equipment in the system.

6. The transmitting communication equipment of claim 2 wherein all the time-delay intolerant data packets in the aggregated data packet are designated for reception and use by a single end-user terminal.

7. The transmitting communication equipment of claim 2 wherein the aggregator performs channel coding and modulation on the aggregated packet.

8. A transmitting communication equipment comprising:
   a signal encoder for generating a stream of data packets, said data packets comprising time-delay intolerant information and being scheduled for transmission at a designated rate, said designated rate being based on at least one time delay constraint of the data packets;
   an aggregator for aggregating a plurality of said data packets into an aggregated data packet, wherein the number of data packets in said plurality is based on an aggregation factor; and
   a transmitter for transmitting the aggregated data packet over a communication channel, said aggregated packet being transmitted at a rate other than the designated rate;
   wherein the aggregation factor is determined based on (i) negotiation information received by the transmitting communication equipment and (ii) channel conditions of the communication channel over which the aggregated packet is to be transmitted.

9. The transmitting communication equipment of claim 8, wherein the aggregation factor is further based on a plurality of user service requirements, said user service requirements comprising: (i) a data rate capability of a communication system within which the equipment is used, (ii) a current loading level of the communication system and/or communication channel, and (iii) a designated service level of a receiving communication equipment in the communication system.

10. The transmitting communication equipment of claim 8, wherein:

the signal encoder and aggregator operate in an application layer of a communication system within which the equipment is used, said aggregated data packet being generated in the application layer; and the aggregated data packet is divided into a plurality of transmission packets at a transport layer of the communication system.

11. The transmitting communication equipment of claim 8, wherein the signal encoder is a vocoder, and the data packets are voice data packets generated by the vocoder at the designated rate.

12. A method of transmitting information, said method comprising the steps of:

aggregating a plurality of data packets into an aggregated data packet, said data packets comprising time-delay intolerant information and being scheduled for periodic transmission at a designated rate, wherein the number of data packets in said plurality is based on an aggregation factor; and transmitting the aggregated data packet over a communication channel, said aggregated packet being transmitted at a rate other than the designated rate;

wherein the aggregation factor is determined based on (i) negotiation information received by a transmitting communication equipment and (ii) channel conditions of the communication channel over which the aggregated packet is transmitted.

13. The method of claim 12 wherein the aggregation factor is further based on a plurality of user service requirements, said user service requirements comprising: (i) a data rate capability of a communication system, (ii) a current loading level of the communication system and/or communication channel, and (iii) a designated service level of the receiving communication equipment in the communication system.

14. The method of claim 13 wherein:

the plurality of data packets are generated and aggregated in an application layer of the communication system; and the aggregated data packet is divided into a plurality of transmission packets at a transport layer of the communication system.

* * * * *